United States Patent Office 2,983,694
Patented May 9, 1961

2,983,694

SILOXANE ELASTOMERS

Nigel Page, Barry, and John Tudor Lewis, Dinas Powis, Wales, assignors to Midland Silicones Limited, London, England No Drawing. Filed Apr. 29, 1958, Ser. No. 731,629

10 Claims. (Cl. 260—18)

This invention relates to improved room temperature-curing siloxane elastomers.

The best room temperature-curing siloxane elastomers previously known were those described in United Kingdom specifications Nos. 687,759 and 764,246. Those described in United Kingdom specification No. 687,759 are prepared by the incorporation of alkyl silicates into polysiloxanes which contain acid groups such as phosphate and sulphate in the polymers, but are not suitable for use where a corrosion problem exists. United Kingdom specification No. 764,246 describes the use of alkyl polysilicates and carboxylic acid salts of metals ranging from manganese to lead in the electromotive series, the acid radicals having less than 16 carbon atoms, with acid-free polysiloxanes, to give room temperature-curing elastomers free from corrosive material.

Almost all previously-known room temperature-curing siloxane elastomers suffer however from the serious defect that if in the form of sheets of thickness greater than $\frac{1}{16}''$, on being heated after vulcanisation they soften and "blow" to give a foam structure, and under the action of boiling water they degrade rapidly to a soft mass having little or no elasticity.

It is an object of this invention to provide a siloxane elastomer which cures at room temperature, and which retains its elastomeric properties when subjected to high temperatures and to boiling water.

According to the present invention there is provided an organosiloxane elastomer-forming composition consisting essentially of (1) an acid-free organopolysiloxane having a viscosity of at least 100 cs. at 25° C. having the average general formula

and being composed mainly of diorganosiloxane units, where each R is a monovalent hydrocarbon radical or halogenated hydrocarbon radical, from 0.05 to 10% of the radicals R being alkenyl radicals and a large proportion of the end groups being hydroxyl, and $n$ has an average value of from 1.99 to 2 inclusive, (2) from 0.1 to 50% by weight of an alkyl silicate having more than two alkoxy groups or an alkyl polysilicate resulting from the polymerisation of said alkyl silicate; (3) from 0.01 to 5% by weight of a carboxylic acid salt of a metal ranging from lead to manganese inclusive in the electromotive series of metals, the acid radicals of the said salt having less than 16 carbon atoms and (4) from 0.01 to 5% by weight of an organic peroxide, all the weights being calculated on the weight of the polysiloxane.

The acid-free siloxanes employed in this invention can contain attached to the silicon atoms any monovalent hydrocarbon radical and/or any halogenated hydrocarbon radical, provided that from 0.05 to 10% of the radicals are alkenyl radicals, preferably vinyl radicals and that a large proportion of the end groups are hydroxyl. The term "acid-free" as used herein means that the siloxane polymer is free from acid groups such as $\equiv$SiA where A is an acid group for example, Cl, —OSO$_3$H, —OPO$_3$H$_2$, or —OPO$_3$HEt. The siloxanes employed in this invention are substantially diorgano-substituted siloxanes which may contain limited amounts of monoorgano-substituted siloxanes. Preferably the siloxanes should be substantially free from triorganosiloxane units, and should be end-blocked with hydroxyl groups. Specific examples of R groups other than alkenyl groups which are operative in this invention are alkyl groups such as methyl, ethyl and octadecyl; cycloaliphatic groups such as cyclohexyl and cyclopentyl; aromatic hydrocarbon radicals such as phenyl, xenyl and naphthyl; aralkyl groups such as benzyl, alkaryl groups such as tolyl and xylyl; halogenated monovalent hydrocarbon radicals such as chloromethyl, bromophenyl, tetrafluoroethyl, trifluorovinyl, trifluorotolyl, hexafluoroxylyl, heptachloroxenyl, heptafluoropropyl, chlorodifluorovinyl, chlorohexafluorocyclopentyl, 1-bromo-3-tribromopropyl and

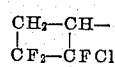

It is to be understood that the siloxanes employed herein can be either homo-polymeric materials or co-polymeric materials containing two or more different types of siloxane units and further that both organic radicals attached to any one silicon atom can be the same or the radicals attached to any one silicon atom can be different.

The polymeric siloxanes which are employed in this invention can range in viscosity from 100 cs. upwards at 25° C. Thus, the polymers can be thin liquids or non-flowing benzene-soluble gums or insoluble gels. The particular physical state of the polymer will vary depending upon the use of the elastomer. Thus liquid polymers having a viscosity of the order of 2,000 to 25,000 cs. at 25° C. are preferred for those applications such as coating or potting. When excellent stress-strain properties are desired it is preferable to employ high molecular weight non-flowing soluble gums. In general, it is preferred that the polymers are soluble in benzene.

The preferred alkyl silicates and alkyl polysilicates within the scope of this invention are those in which the alkyl radical contains less than 6 carbon atoms. Specific examples of such silicates are methyl, ethyl, isopropyl, n-butyl and secondary amyl silicates. It is to be understood that mixtures of two or more silicates can be employed if desired. The silicates should be substantially free from volatile materials such as alcohols. Preferably the polysilicates should be liquid or toluene-soluble. The polysilicates themselves are polymeric materials in which the silicon atoms are linked through Si-O-Si linkages, the remaining valences of the silicon being satisfied primarily by alkoxy radicals. Such materials are commercially available, although generally it is preferable to devolatilise the commercial products prior to use. This may be done by heating at reduced pressure at temperatures up to 250° C.

The curing of the compositions of this invention is accomplished by mixing the polysiloxane, the alkyl silicate, an organic peroxide, and a curing catalyst comprising a carboxylic acid salt of a metal ranging from lead to manganese in the electromotive series of metals. Specifically, the metals included are lead, tin, nickel, cobalt, iron, cadmium, chromium zinc and manganese. Any carboxylic acid salt of these metals is operative in this invention provided the carboxylic acid contains less than 16 carbon atoms in the molecule.

It is preferable that the salt be soluble in the siloxane although insoluble salts may be employed if they are properly dispersed in the system. The dispersion may be carried out by employing a solution of the catalyst in a mutual solvent with the siloxane, or the catalyst may be dispersed on a filler and thereafter milled into the siloxane.

The term "carboxylic acid salt" as employed herein includes those salts which contain hydrocarbon radicals attached to the metal, for example, dibutyl tin diacetate.

Specific examples of salts which are operative in this invention are the naphthenates of the above metals such as lead naphthenate, cobalt naphthenate and zinc naphthenate, salts of fatty acids such as iron 2-ethylhexoate, lead 2-ethylhexoate and chromium octoate, salts of aromatic carboxylic acids such as dibutyl tin dibenzoate, salts of polycarboxylic acids such as dibutyl tin adipate and lead sebacate and salts of hydrocarboxylic acids such as dibutyl tin diacetate.

The amount of catalyst can be varied from 0.01% to 10% calculated upon the weight of the siloxane. A mixture of two or more of the defined salts may be employed if desired. The amount of catalyst varies from compound to compound depending upon the activity of the specific compound in question and also the amount of catalyst will be varied depending upon the particular use for the product. For example, when a fast cure is desired, more catalyst is required. If one wishes to delay the cure, for example, applications where extensive fabrication time is required less catalyst is used. In general, catalyst concentrations of from 0.2 to 2 percent calculated on the weight of the siloxane are sufficient.

The organic peroxides suitable for use in this invention are any of the peroxides normally employed as curing agents of heat-curing elastomers, for example ditertiary butyl peroxide, or dicumyl peroxide. Dicumyl peroxide has been found to give the best results.

If desired, fillers can be incorporated into the elastomers of this invention. Suitable fillers include organic materials such as cork, wood flour, cotton linters and organic fabrics or inorganic fillers such as calcium carbonate, titania, carbon black and silica powders. The latter fillers are preferred in those applications requiring high temperature stability. If employed, the amount of filler may range from 10 to 300 or more percent by weight calculated on the weight of the polysiloxane.

The compositions of this invention may be compounded in the usual manner for compounding siloxane elastomers. It is generally most inconvenient to compound the peroxide with the organosiloxane i.e. one may compound the polymer, filler, peroxide, and silicate and add the carboxylic acid just prior to use, or one may compound the polymer, filler, peroxide and carboxylic acid salt, and then add the silicate just prior to use. The latter method is particularly valuable in coating applications where a mixture of polymer, salt, and if desired a filler can be applied to the base member and thereafter a coating of the polysilicate can be applied in any convenient manner such as by brushing or spraying. The polysilicate will diffuse into the polysiloxane coating and curing in situ will thereupon occur.

Curing of the composition and formation of the elastomers of this invention takes place spontaneously at room temperature upon mixing the polysiloxane, polysilicate and carboxylic acid salt. The curing in general will require from 1 to 3 days at room temperature. If desired, the curing time can be increased by maintaining the mixture at a temperature below room temperature, for example, at 0° C., or the curing time can be decreased by employing elevated temperatures. It is to be understood, of course, that if desired, the elastomer-forming compositions of this invention can be cured in a press at temperatures of 150° C. to 250° C. The products can be hot or cold moulded or extruded, although in carrying out extrusion operations care should be taken that the curing does not advance too far prior to extrusion.

The products of this invention are particularly adaptable for potting compounds. For example, a liquid polymer of a viscosity of for example 10,000 cs. at 25° C. may be compounded with the polysilicate and, if desired, enough filler so that the material can still be poured. The catalyst may then be added and the material poured into the container whereupon it will set in a matter of a day to a rubbery material which will completely fill the voids in the apparatus.

The materials of this invention have heat stabilities comparable with those of previously known siloxane elastomers. This is exhibited by the small reduction of physical properties after heating at 250° C. and also by low weight loss during heating. Furthermore, the stress-strain properties of some of the elastomers of this invention are far superior to those of any known siloxane elastomer.

The elastomers of this invention are useful for electrical insulation, for sealing of voids and for any other use where elastomeric products are needed.

The elastomers of this invention even when in thick section, will not soften or "blow" when subjected to temperatures of the order of 250° C., and will not soften in boiling water. If desired the uncured composition may be treated with boiling water whereupon it will cure and attain the same elastomeric properties that it attains if cured first and then treated with boiling water.

It is believed that the organic peroxide plays no part in the curing of the composition at room temperature, only exerting an effect when the temperature is raised. The use of organic peroxides in conjunction with vinyl-containing polysiloxanes in the compounding of heat-curable elastomeric compositions is well known, but their use in the compounding of room temperature vulcanising elastomers is quite novel.

The term "consisting essentially of" as employed herein means that the materials of this invention contain four essential ingredients namely, the defined polysiloxanes, alkyl silicates, or alkyl polysilicates, carboxylic acid salts, and organic peroxides, but that non-essential ingredients such as oxidation inhibitors, compression set additives, pigments, fillers and other specialised ingredients normally employed in siloxane elastomers may also be present.

The following examples in which the parts are by weight illustrate the invention:

In the tables given in the examples D=durometer (Shore hardness), T in lbs./sq. in. means tensile strength at break in lbs. sq. in. percent, E means percent elongation at break.

Example 1

The following stocks were compounded as shown in the table, the catalyst in each case being 1% of the total weight of a mixture of dibutyl tin dilaurate and ethyl polysilicate in a ratio of 1:3, the mixes being milled together then moulded as ¾ in. cubes. They were set up for 24 hours at room temperature and then placed in an oven at a temperature of 250° C. and observed at various times up to 24 hours.

"Celite Superfloss" is a form of diatomaceous earth filler (shortened to "Superfloss"), the word "Celite" being a registered trademark.

"Luperco CSF" is a 40 percent dispersion of 2,4-dichlorobenzoyl peroxide in dimethylpolysiloxane oil, the word "Luperco" being a registered trademark.

"Luperco ASF" is a 60 percent solution of benzoyl peroxide in dimethylpolysiloxane oil.

"Dicup 40" is a powder, compound of 40% dicumyl peroxide and 60% of calcium carbonate.

The results are shown in the table below; parts being by weight:

| Mix | Softening | Sponging |
|---|---|---|
| Dimethylpolysiloxane gum, 100 parts. "Superfloss", 68 parts. | Bad at 4 hours. Hardened at 24 hours. | Large open structure. |
| The above stock devolatilised at 180° C. Dimethylpolysiloxane gum, 100 parts. "Superfloss", 68 parts. "Luperco ASF", 3 parts. | Degraded to soft paste. Did not soften as much as previous batches. | Soft foam structure after 24 hours. Sponged badly. |
| The first stock above devolatilised at 180° C., then mixed with "Luperco ASF", 3 parts. | Softened to a thin paste. | Sponged slightly and hardened at 24 hours. |
| Dimethylpolysiloxane gum, 100 parts. "Superfloss", 68 parts. "Luperco CSF", 2 parts. | Softened more than corresponding ASF mix. | Did not sponge as much as corresponding ASF mix. |
| Methylvinylpolysiloxane gum (0.33% of organic radicals being vinyl), 100 parts. "Superfloss", 68 parts. "Luperco CSF", 0.5 part or 1.0 part. | Not as soft as the dimethylpolysiloxane mixes. | Sponged but not as much as the dimethylpolysiloxane mixes. |

| Mix | Softening | Sponging |
|---|---|---|
| Methylvinylpolysiloxane gum (0.5% of organic radicals being vinyl) 100 parts. "Superfloss", 68 parts. Ditertiary butyl peroxide, 0.5 part. | Very slight at 1 hour hard at 24 hours. | Nil. |
| Methylvinylpolysiloxane gum (0.5% of organic radicals being vinyl), 100 parts. "Superfloss", 68 parts. "Dicup 40," 2 parts. | Nil | Nil. |
| Methylvinylpolysiloxane gum (0.5% of organic radicals being vinyl), 100 parts. "Superfloss," 68 parts. "Dicup 40," 5 parts. | No softening up to 7 days at 250° C. | Nil. |
| Methylvinylpolysiloxane gum (0.5% of organic radicals being vinyl), 100 parts. "Superfloss," 68 parts. "Dicup 40," 1.25 parts. | Nil | Nil. |

Example 2

The table below shows the resistance to some heavy and fluid grade room-temperature-vulcanising stocks to boiling water. The catalyst was in each case a mixture of one part of dibutyl tin dilaurate to three parts of ethyl polysilicate, 1% by weight was used in the heavy grades (those using gum) and 2% by weight in the fluid grades (those using fluid). $E_B$ signifies percentage elongation at break. Gum (or fluid) 1 is a dimethyl polysiloxane gum (or fluid). Gum (or fluid) 2 is a methylvinyl polysiloxane gum (or fluid) (0.5% of organic radicals being vinyl). "Zircosil 5" is a form of zirconium silicate filler, the word "Zircosil" being a registered trademark. The mixes were made up, milled, moulded in ¾" cubes and allowed to set for 24 hours at room temperature before being immersed in boiling water.

| Stock | Days Immersion in Boiling Water |||||||||||||
|---|---|---|---|---|---|---|---|---|---|---|---|---|---|
| | 0 days ||| 1 day ||| 2 days ||| 3 days |||
| | T | $E_B$ | D | T | $E_B$ | D | T | $E_B$ | D | T | $E_B$ | D |
| Gum 1, 100 parts. Superfloss, 68 parts. | 682 | 305 | 60 | (1) | (1) | (1) | (1) | (1) | (1) | | | |
| Gum 2, 100 parts. Superfloss, 68 parts. Luperco CSF, 2 parts. | | | | (1) | (1) | (1) | (1) | (1) | (1) | | | |
| Gum 2, 100 parts. Superfloss, 68 parts. Ditertiary butyl peroxide, 2 parts. | 551 | 315 | 52 | 265 | 415 | <30 | (1) | (1) | (1) | | | |
| Gum 2, 100 parts. Superfloss, 68 parts. Dicumyl peroxide, 2 parts. | 480 | 305 | 46 | 425 | 180 | 53 | 502 | 85 | 66 | 507 | 90 | 61 |

1 Too soft to test.

| Stock | 0 days ||| 1 day ||| 2 days ||| 3 days ||| 7 days ||| 14 days |||
|---|---|---|---|---|---|---|---|---|---|---|---|---|---|---|---|---|---|---|
| | T | $E_B$ | D | T | $E_B$ | D | T | $E_B$ | D | T | $E_B$ | D | T | $E_B$ | D | T | $E_B$ | D |
| Gum 2, 100 parts. Superfloss, 68 parts. Dicumyl peroxide, 0.5 part. | 464 | 295 | 42 | | | | | | | 332 | 95 | 55 | 265 | 75 | 55 | 205 | 35 | 58 |
| Fluid 1, 100 parts. Zircosil 5, 100 parts. | 398 | 174 | 39 | 27 | 160 | <30 | (1) | (1) | (1) | (1) | (1) | (1) | | | | | | |
| Fluid 2, 100 parts. Zircosil 5, 100 parts. Dicup 40, 5 parts. | 474 | 290 | 36 | 502 | 95 | 54 | | | | 466 | 95 | 58 | | | | | | |
| Fluid 2, 100 parts. Zircosil 5, 100 parts. Dicup 40, 2.5 parts. | 315 | 215 | 37 | 430 | | 52 | | | | 409 | 85 | 57 | | | | | | |
| Fluid 2, 100 parts. Zircosil 5, 100 parts. Dicup 40, 1.25 parts. | 348 | 250 | 37 | 309 | 80 | 52 | | | | 401 | 100 | 56 | | | | | | |

1 Too soft to test.

Example 3

The table below shows the effect of heat aging on some heavy and fluid grade room temperature rubbers. The stocks were compounded and moulded as in Example 2, except that 4% of catalyst was used in the fluid grades. The stocks were allowed to set up for 24 hours at room temperature and then aged at 250° C.

| Stock | Days at 250° C. | | | | | | | | | | | | | | |
|---|---|---|---|---|---|---|---|---|---|---|---|---|---|---|---|
| | 0 days | | | 1 day | | | 3 days | | | 7 days | | | 14 days | | |
| | T | $E_B$ | D | T | $E_B$ | D | T | $E_B$ | D | T | $E_B$ | D | T | $E_B$ | D |
| Gum 1, 100 parts<br>Superfloss, 68 parts | 682 | 305 | 60 | 121 | 340 | 20 | 263 | 210 | 41 | 267 | 193 | 51 | 340 | 126 | 63 |
| Gum 1, 100 parts<br>Superfloss 68, parts<br>Luperco CSF, 2 parts | 557 | 310 | 50 | 187 | 255 | 32 | 253 | 200 | 37 | 201 | 245 | 39 | 185 | 190 | 42 |
| Gum 2, 100 parts<br>Superfloss, 68 parts<br>Ditertiary butyl peroxide, 2 parts | 551 | 315 | 52 | 134 | 380 | <30 | 154 | 385 | <30 | 452 | 60 | 82 | 675 | 10 | 98 |
| Gum 2, 100 parts<br>Superfloss, 68 parts<br>Dicup 40, 5 parts | 480 | 305 | 46 | 548 | 100 | 62 | 627 | 95 | 67 | 975 | 65 | 77 | 823 | 15 | 97 |
| Gum 2, 100 parts<br>Superfloss, 68 parts<br>Dicup 40, 2.5 parts | 460 | 235 | 51 | 600 | 105 | 66 | 557 | 95 | 64 | 700 | 80 | 73 | 770 | 70 | 78 |
| Gum 2, 100 parts<br>Superfloss, 68 parts<br>Dicup, 1.25 parts | 464 | 295 | 42 | 452 | 120 | 55 | 467 | 100 | 59 | 482 | 90 | 65 | 592 | 90 | 71 |
| Fluid 1, 100 parts<br>Zircosil 5, 100 parts | 461 | 190 | 39 | | | | | | | 324 | 130 | 41 | 248 | 180 | 38 |
| Fluid 2, 100 parts<br>Zircosil 5, 100 parts<br>Dicup 40, 5 parts | 474 | 290 | 36 | | | | | | | 607 | 65 | 78 | 706 | 60 | 82 |
| Fluid 2, 100 parts<br>Dicup 40, 2.5 parts | 315 | 225 | 37 | | | | | | | 603 | 70 | 71 | 530 | 60 | 77 |
| Fluid 2, 100 parts<br>Zircosil 5, 100 parts<br>Dicup 40, 1.25 parts | 348 | 250 | 37 | | | | | | | 536 | 105 | 65 | 641 | 90 | 68 |

Example 4

The following data show the properties of a stock compounded according to the present invention, using a monomeric catalyst instead of the polymeric ethyl silicate of the first two examples.

The catalyst was 3% of the total weight, of a mixture of methyltriethoxy silane and dibutyl tin dilaurate in a ratio of 3:1, and the stock comprised:

| | Parts |
|---|---|
| Methylvinylpolysiloxane gum (0.5% of organic radicals being vinyl) | 100 |
| Superfloss | 68 |
| Dicup 40 | 1.25 |

The stock was milled, moulded in 1" cubes and allowed to set for 24 hours at room temperature before its properties were evaluated.

| | T | $E_B$ | D |
|---|---|---|---|
| Properties after 24 hr. set | 487 | 295 | 49 |
| After 48 hours immersion in boiling water | 240 | 35 | 63 |
| After 250° C. for 2 hours | (1) | (1) | (1) |

[1] Did not soften or blow.

What we claim is:

1. The process for making a composition of matter which can be converted at relatively low temperatures to a cured, solid elastic state, which process comprises forming a mixture of ingredients consisting essentially of (1) an organopolysiloxane having a viscosity of at least 100 cs. at 25° C. having the average general formula $$R_nSiO_{\frac{4-n}{2}}$$

and being composed mainly of diorganosiloxane units, where each R is selected from the group consisting of monovalent hydrocarbon radicals and halogenated hydrocarbon radicals, from 0.05 to 10% of the radicals R being alkenyl radicals and a large proportion of the end groups being hydroxyl, and n has an average value of from 1.99 to 2 inclusive, (2) from 0.1 to 50% by weight of a silicate selected from the group consisting of alkyl silicates having more than two alkoxy groups and polymers of said alkyl silicates, (3) from 0.01 to 5% by weight of a carboxylic acid salt of a metal ranging from lead to manganese in the electromotive series of metals, the acid radicals of the said salt having less than 16 carbon atoms, and (4) from 0.01 to 5% by weight of an organic peroxide, all the weights being calculated on the weight of the polysiloxane.

2. The process for making a composition of matter which can be converted at relatively low temperatures to a cured, solid elastic state, which process comprises forming a mixture of ingredients consisting essentially of (1) an organopolysiloxane having a viscosity of at least 100 cs. at 25° C. having the average general formula $$R_nSiO_{\frac{4-n}{2}}$$

and being composed mainly of diorganosiloxane units, where each R is selected from the group consisting of monovalent hydrocarbon radicals and halogenated hydrocarbon radicals, from 0.05 to 10% of the radicals R being vinyl radicals and a large proportion of the end groups being hydroxyl, and n has an average value of from 1.99 to 2 inclusive, (2) from 0.1 to 50% by weight of a silicate selected from the group consisting of alkyl silicates having more than two alkoxy groups and polymers of said alkyl silicates, (3) from 0.01 to 5% by weight of a carboxylic acid salt of a metal ranging from lead to manganese in the electromotive series of metals, the acid radicals of the said salt having less than 16 carbon atoms, and (4) from 0.01 to 5% by weight of an organic peroxide, all the weights being calculated on the weight of the polysiloxane.

3. The process for making a composition of matter which can be converted at relatively low temperatures to a cured, solid elastic state, which process comprises forming a mixture of ingredients consisting essentially of (1) an organopolysiloxane having a viscosity of at least 100 cs. at 25° C. having the average general formula $$R_nSiO_{\frac{4-n}{2}}$$

and being composed mainly of diorganosiloxane units, where each R is a methyl radical, from 0.05 to 10% of the radicals R being alkenyl radicals and a large proportion of the end groups being hydroxyl, and $n$ has an average value of from 1.99 to 2 inclusive, (2) from 0.1 to 50% by weight of a silicate selected from the group consisting of alkyl silicates having more than two alkoxy groups and polymers of said alkyl silicates, (3) from 0.01 to 5% by weight of a carboxylic acid salt of a metal ranging from lead to manganese in the electromotive series of metals, the acid radicals of the said salt having less than 16 carbon atoms, and (4) from 0.01 to 5% by weight of an organic peroxide, all the weights being calculated on the weight of the polysiloxane.

4. The process for making a composition of matter which can be converted at relatively low temperatures to a cured, solid elastic state, which process comprises forming a mixture of ingredients consisting essentially of (1) an organopolysiloxane having a viscosity of at least 100 cs. at 25° C. having the average general formula $$R_nSiO_{\frac{4-n}{2}}$$

and being composed mainly of diorganosiloxane units, where each R is a phenyl radical, from 0.05 to 10% of the radicals R being alkenyl radicals and a large proportion of the end groups being hydroxyl, and $n$ has an average value of from 1.99 to 2 inclusive, (2) from 0.1 to 50% by weight of a silicate selected from the group consisting of alkyl silicates having more than two alkoxy groups and polymers of said alkyl silicates, (3) from 0.01 to 5% by weight of a carboxylic acid salt of a metal ranging from lead to manganese in the electromotive series of metals, the acid radicals of the said salt having less than 16 carbon atoms, and (4) from 0.01 to 5% by weight of an organic peroxide, all the weights being calculated on the weight of the polysiloxane.

5. The process for making a composition of matter which can be converted at relatively low temperatures to a cured, solid elastic state, which process comprises forming a mixture of ingredients consisting essentially of (1) an organopolysiloxane having a viscosity of at least 100 cs. at 25° C. having the average general formula $$R_nSiO_{\frac{4-n}{2}}$$

and being composed mainly of diorganosiloxane units, where some of the R radicals are methyl radicals and others of the R radicals are phenyl radicals, from 0.05 to 10% of the radicals R being alkenyl radicals and a large proportion of the end groups being hydroxyl, and $n$ has an average value of from 1.99 to 2 inclusive, (2) from 0.1 to 50% by weight of a silicate selected from the group consisting of alkyl silicates having more than two alkoxy groups and polymers of said alkyl silicates, (3) from 0.01 to 5% by weight of a carboxylic acid salt of a metal ranging from lead to manganese in the electromotive series of metals, the acid radicals of the said salt having less than 16 carbon atoms, and (4) from 0.01 to 5% by weight of an organic peroxide, all the weights being calculated on the weight of the polysiloxane.

6. The process for making a composition of matter which can be converted at relatively low temperatures to a cured, solid elastic state, which process comprises forming a mixture of ingredients consisting essentially of (1) an organopolysiloxane having a viscosity of at least 100 cs. at 25° C. having the average general formula $$R_nSiO_{\frac{4-n}{2}}$$

and being composed mainly of diorganosiloxane units, where each R is selected from the group consisting of monovalent hydrocarbon radicals and halogenated hydrocarbon radicals, from 0.05 to 10% of the radicals R being alkenyl radicals and a large proportion of the end groups being hydroxyl, and $n$ has an average value of from 1.99 to 2 inclusive, (2) from 0.1 to 50% by weight of a silicate selected from the group consisting of alkyl silicates having more than two alkoxy groups and polymers of said alkyl silicates, (3) from 0.01 to 5% by weight of dibutyl tin dilaurate, and (4) from 0.01 to 5% by weight of an organic peroxide, all the weights being calculated on the weight of the polysiloxane.

7. The process for making a composition of matter which can be converted at relatively low temperatures to a cured, solid elastic state, which process comprises forming a mixture of ingredients consisting essentially of (1) an organopolysiloxane having a viscosity of at least 100 cs. at 25° C. having the average general formula $$R_nSiO_{\frac{4-n}{2}}$$

and being composed mainly of diorganosiloxane units, where each R is selected from the group consisting of monovalent hydrocarbon radicals and halogenated hydrocarbon radicals, from 0.05 to 10% of the radicals R being alkenyl radicals and a large proportion of the end groups being hydroxyl, and $n$ has an average value of from 1.99 to 2 inclusive, (2) from 0.1 to 50% by weight of ethylpolysilicate, (3) from 0.01 to 5% by weight of a carboxylic acid salt of a metal ranging from lead to manganese in the electromotive series of metals, the acid radicals of the said salt having less than 16 carbon atoms, and (4) from 0.01 to 5% by weight of an organic peroxide, all the weights being calculated on the weight of the polysiloxane.

8. The process of claim 1 further characterized in that a filler is incorporated into the mixture.

9. The process of claim 8 wherein the filler is diatomaceous earth.

10. The process of claim 8 wherein the filler is zirconium silicate.

References Cited in the file of this patent

UNITED STATES PATENTS

| | | |
|---|---|---|
| 2,445,794 | Marsden | July 27, 1948 |
| 2,645,628 | Hurd | July 14, 1953 |
| 2,843,555 | Berridge | July 15, 1958 |

UNITED STATES PATENT OFFICE
CERTIFICATE OF CORRECTION

Patent No. 2,983,694 May 9, 1961

Nigel Page et al.

It is hereby certified that error appears in the above numbered patent requiring correction and that the said Letters Patent should read as corrected below.

Column 3, line 53, after "example," insert -- in --; line 73, for "inconvenient" read -- convenient --.

Signed and sealed this 30th day of January 1962.

(SEAL)
Attest:

ERNEST W. SWIDER
Attesting Officer

DAVID L. LADD
Commissioner of Patents